Nov. 2, 1954 A. A. MACDONALD 2,693,530

TELEVISION APPARATUS

Filed June 29, 1949

WITNESSES:

E. A. McCloskey

Leroy M. Garman

INVENTOR

Angus A. Macdonald.

BY

F. E. Browder

ATTORNEY

United States Patent Office 2,693,530

Patented Nov. 2, 1954

2,693,530

TELEVISION APPARATUS

Angus A. Macdonald, Catonsville, Md., assignor to Westinghouse Electric Corporation, East Pittsburgh, Pa., a corporation of Pennsylvania Application June 29, 1949, Serial No. 102,131

8 Claims. (Cl. 250—27)

The present invention relates generally to signal generators, and more particularly to television bar generators for providing signals, which, when applied to a cathode ray type television receiving equipment, provides test patterns on the cathode ray tube indicator of the equipment for indicating the scanning linearity thereof.

Television bar generators are utilized to provide a visual indication of the vertical and horizontal scanning linearity of a picture reproducing system. Measurements of scanning linearity made by means of a bar generator are particularly advantageous since they provide indications which are independent of the scanning linearity of the camera or monoscope equipment. Broadly described, a television bar generator functions to produce a pattern of electrical pulses which, when applied to the picture reproducing system produces selectively a pattern of light bars on a dark background, or dark bars on a light background, on the face of the cathode ray tube of the system. The bars produced may be either horizontal, or vertical, or both types of bars may be produced simultaneously. The bars should be narrow relative to the space between them, and the repetition rate of the bars must be very precise in order to facilitate precise measurements of linearity. Furthermore, the horizontal and vertical dimensions of the picture must include a considerable number of bars and the bars must be adjustable in respect to their width, if the bar generator is to have maximum utility.

It is a broad object of the present invention to provide a novel and improved television bar generator.

It is a further object of the present invention to provide a television bar generator which may be synchronized by the synchronizing signals applied to the television picture reproducing system.

It is another object of the present invention to provide a television bar generator capable of generating a pulse pattern suitable for application to a television picture reproducing system, for generating either dark bars on a white background, or, in the alternative, white bars on a dark background, and capable further of providing either vertical or horizontal lines, or both.

Still another object of the invention is to provide a television bar generator capable of producing more accurately spaced pulses than has been the case in the prior art, whereby the reproduced bars may be more accurately spaced.

It is still another object of the invention to provide a television bar generator capable of providing bars of adjustable width.

Still a further object of the invention is to provide a television bar generator adaptable to determine scanning linearities of picture reproducing systems of color or conventional black and white type.

It is still another object of the invention to provide a bar generator for television systems which shall be extremely simple to operate, and economical to fabricate, and one which requires no complex adjustments for adapting the generator to operate to produce any of the various types of presentations of which it is capable.

Further objects, features and advantages of the present invention will become apparent as the description of specific embodiments of the invention proceed.

Briefly described, the present invention is embodied in a television bar generator which is capable of producing a pattern of electrical pulses of such character that when applied to a television picture reproducing system, there is generated on the screen of the system a plurality of equally spaced light bars on a dark background, or, conversely, a plurality of equally spaced dark bars on a light background, the bars extending selectively either horizontally across the screen, or vertically across the screen, or both vertically and horizontally, the timing of the pulse pattern being sufficiently precise that any discrepancy of spacing of the bars will be indicative of non-linearity of the reproducing system itself.

The pulses produced by the bar generator embodying the present invention are synchronized from the blanking or driving pulses normally generated in the conventional type of television sync generator or reproducing system, and specifically by the blanking pulses generated during fly-back of the scanning cathode ray beam in cathode ray tube television systems, or the driving pulses which drive the cathode ray tube sweep.

In accordance with the present invention, the horizontal blanking pulses are applied to a coherent oscillator, which, in response to each blanking pulse, generates a train of undamped sine wave oscillations of very precisely determined frequency, the number of cycles in each train, and the magnitude of the signals of the train, being readily determinable by simple manual adjustment of circuit parameters of the coherent oscillator. Similarly, the vertical blanking pulses of the television reproducing system are utilized to shock excite a relatively low frequency coherent oscillator, which provides undamped wave trains of sinusoidal oscillations, each train consisting of a number of sinusoids, the number and magnitudes of which may be readily determined by manual adjustment of the circuit parameters of the coherent oscillator.

The outputs of the two coherent oscillators are generally arranged to be substantially equal, when both vertical and horizontal bars are desired simultaneously, and are applied then to the input circuit of a mixer or combining arrangement, which provides at its output portions of the low and the high frequency sinusoids provided by the coherent oscillators, on a single lead, and which includes means for selecting desired portions of the output signals and for eliminating completely either one of the output signals, as desired.

The output signals derived from the mixer or combining systems is applied to key a multivibrator or square wave generator, which is of the controlled one shot cathode coupled type, that is, which is keyed both on and off in response to the input signals applied thereto. In the present system the multivibrator is arranged to be turned on when the sine wave signal applied thereto reaches a predetermined magnitude, to remain on while the signal applied thereto exceeds such magnitude, and to be turned off when the magnitude of the sine wave signal applied thereto has decreased to a predetermined value. Accordingly, the multivibrator is keyed on and then off during each cycle of sinusoidal oscillations applied thereto. In the presence of two sinusoids of differing frequency the multivibrator operates to produce a relatively complex pattern of narrow pulses inter-spersed with relatively wider pulses, the timing and durations of which are determined by the relative phases and frequencies of the sinusoids, and which are arranged, in accordance with the present system to be suitable for generating the required pattern.

The output of the multivibrator is applied to a pulse amplifier having an output terminal at its cathode, and another at its anode, to enable selective abstraction therefrom of positive or negative pulses, in accordance with the desired type of pattern, the positive pulses providing light bars on a dark background, and the negative pulses providing dark bars on a light background upon provision of proper initial adjustment of the intensity control electrode of the cathode ray tube of the television picture reproducing system.

A modification of the system above briefly described may be employed, should only horizontal or vertical bars be desired, rather than both, which employs the principles of the invention above briefly described, but which enables some circuit simplification and consequent decrease of cost of construction of the generator. In accordance with the modification, synchronizing pulses, which may be either vertical or horizontal, are applied to synchronize the bar generator, and alternative oscillating circuits are provided in a single coherent oscillator, which may be selectively connected to the oscillator in accordance with the character of the synchronizing signal. The output of the coherent oscillator may then be utilized directly to key the multivibrator, and the output of the multivibrator may be amplified to provide the requisite bar generating pulses.

The novel features which I believe to be characteristic of my invention are set forth with particularity in the appended claims; the invention, itself, however, as to both its organization and method will best be understood by reference to the following detailed description of specific embodiments thereof, especially when taken in conjunction with the accompanying drawings, in which I have indicated circuit organizations embodying my invention.

Figure 1:
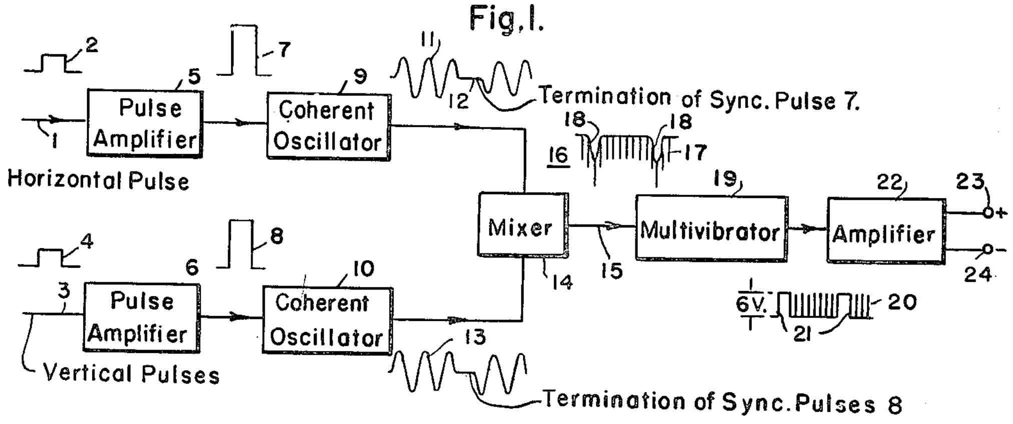
Figure 1 is a block diagram of a bar generator embodying the principles of the invention.

Referring now more specifically to the drawings, and more particularly to Fig. 1 thereof, the reference numeral 1 identifies a lead which may be considered to be a source of horizontal synchronizing pulses 2, and a further lead 3, which may be considered to represent a source of vertical synchronizing pulses 4. The horizontal synchronizing pulses 2 may be amplified in a conventional pulse amplifier 5, and the vertical pulses in a conventional pulse amplifier 6, to provide amplified synchronizing pulses 7 and 8, of suitable magnitude to shock excite the coherent oscillators 9 and 10, respectively, when applied thereto as input exciting voltages.

The coherent oscillator 9, which is synchronized by the horizontal blanking pulses 7, generates in response to each pulse 7 a train of pulses 11, the train initiating at the termination of each horizontal pulse 7 in a predetermined invariable phase, i. e. in a negative sense starting from zero magnitude, and being cut off for the duration of each sync pulse 7, as indicated at 12.

The coherent oscillator 10 operates in a similar manner to the coherent oscillator 9, in response to the synchronizing pulses 8, the coherent oscillator 10, however, being adapted to oscillate at a different frequency than the coherent oscillator 9, and particularly at a frequency suitable for generation of horizontal bars across the face of the cathode ray tube indicator of a television receiver, in response to the vertical blanking pulses. The output wave trains provided by coherent oscillator 10 are illustrated at 13. It is an important feature of the present invention that each wave train, 11, 13 commences in invariable phase at the termination of its initiating pulse.

The output signals derivable from the coherent oscillators 9 and 10 are applied to a mixer circuit or combining circuit 14, which performs the function of combining the oscillation 11 and the oscillations 13, and of deriving peak portions of each, or of eliminating one or the other of the trains of oscillations 11, 13, according as either vertical or horizontal bars are desired on the face of the cathode ray tube indicator. There is, accordingly, provided on the output lead 15 of the mixer 14, a relatively complex pattern of pulses, generally indicated at 16, and comprising equally spaced short interval pulses 17 of negative polarity, corresponding with the peak portions of the high frequency oscillation 11, on which are superimposed relatively infrequent periodic dips in voltage, 18, corresponding with the positive peak portions of the wave train 13 provided by the coherent oscillator 10, the mixer 14 operating in this respect as a phase reversing device and being controllable to pass any desired portion of each oscillation of the wave train 11 and of the wave train 13, and the control being effective to the point that either train of oscillations may be eliminated completely. The pulses 17, illustrated in Fig. 1 of the drawings as lines, are, in actuality of definite width, and correspond in shape with a peak portion of a sine wave, as selected by the mixer 14. The output of the mixer 14, appearing on the lead 15, is applied to synchronize a multivibrator 19, the latter being of the controlled one shot cathode coupled type, which, as is well known, may be keyed on and off under complete control of synchronizing pulses or signals applied thereto, and which provides at its output in response to each synchronizing pulse a square wave signal of predetermined amplitude, regardless of the amplitude of the synchronizing signals applied thereto.

Accordingly, the controlled one shot cathode coupled multivibrator 19 provides at its output a series of pulses 20, which are equally spaced, the spacing being determined by the frequency of the train of oscillations 11, and which has predetermined width determined by the control pulses 17. Inter-spersed with the square pulses 20 are relatively wide, square pulses 21, which correspond in time with, and are responsive to, the synchronizing pulses 18, and which have the same amplitudes as the pulses 20, but correspond in width to the width of pulses 18.

The pulses 20 and 21 are applied to the input of the amplifier 22, for amplification to suitable value for application to the control or intensity electrode of the cathode ray tube indicator of a television system, the output of the amplifier 22 being positively or negatively poled, in accordance, as the pulses are derived from the terminal 23 or from the terminal 24.

Figure 2:
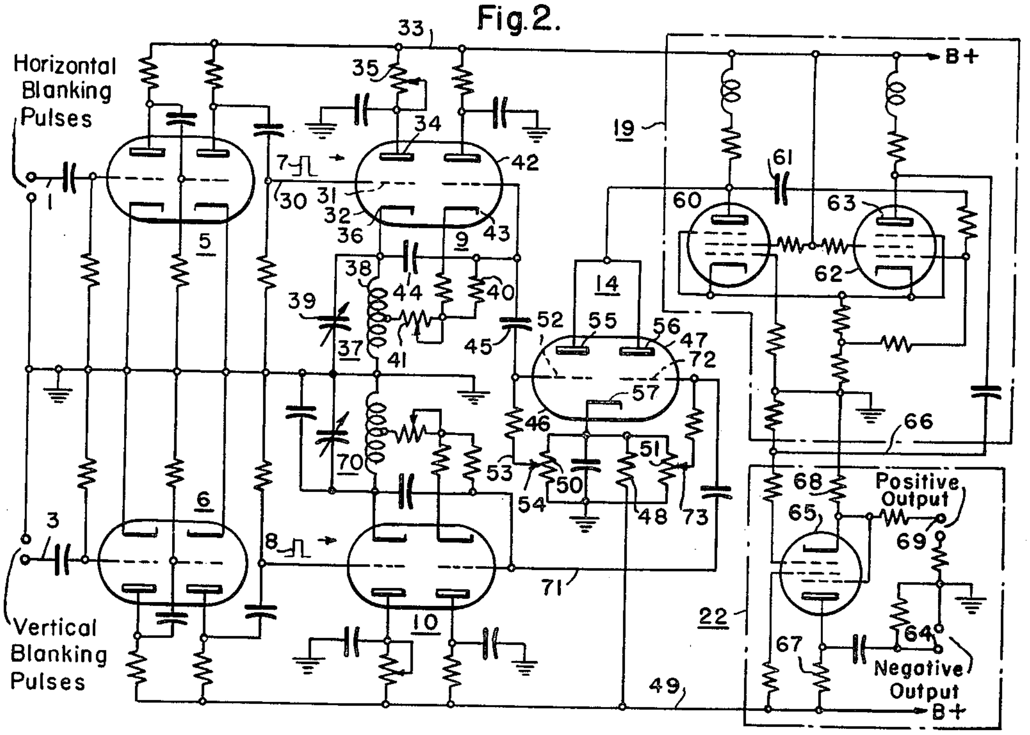
Fig. 2 is a schematic circuit diagram of a television bar generator embodying the principles of the invention illustrated in the functional block diagram of Fig. 1.

Reference is now made more specifically to Fig. 2 of the drawings, which illustrates schematically a circuit diagram of an apparatus arranged in accordance with the present invention and in accordance with the block diagram of Fig. 1 of the drawings. Horizontal blanking pulses may be applied to the terminal 1 of the system for application to the input of a conventional two stage resistance coupled amplifier 5, the detailed arrangement of which forms no part, per se, of the present invention, and the output of which is applied over lead 30 to the control grid 31 of one section 32 of a double triode, incorporated in a so-called coherent oscillator. The triode section 32 contains in its plate or anode circuit, and in series between the B+ lead 33 and the anode 34, a variable resistor 35, the value of which determines the plate current drawn by the triode section 32 when its control grid 31 is biased "on" in response to a synchronizing pulse derived over the lead 30. In series between the cathode 36 of the triode section 32 and ground is connected a tank circuit 37, comprising parallel connected inductance 38 and variable condenser 39. The triode section 32 is normally operated at or beyond cutoff, so that no current exists in the cathode circuit of the triode section 32, and, accordingly, no energy in the tank circuit. In response to application of a positive synchronizing pulse 7 to the control electrode 31, the triode section 32 is rendered conductive, and current flows through the tube, having a magnitude determined primarily by the value of the resistance 35. This current, in flowing through the inductance 38, stores energy in the latter, which, upon subsequent cutoff of the triode section 32 in response to termination of the synchronizing pulse, discharges through the condenser 37, and the discharge becomes oscillatory since the losses of the tank circuit 37 are relatively low. Coupled across a portion of the inductance 38, via a condenser 44, is a pair of series connected resistors 40 and 41, the latter being variable. A triode section 42 is provided, having its cathode 43 connected to the variable tap of the resistance 41, and its control electrode coupled via the condenser 39 directly to the cathode 36 of the triode section 32. Accordingly, a portion of the inductance 38, contained in the tank circuit 37, is connected in the cathode circuit of the triode section 42, and a portion of the voltage developed across the inductance 38 is applied to the input circuit of the triode section 42. The cathode current of the triode section 42 is, accordingly, in phase with the oscillatory current flowing in the inductance 38 of the tank circuit 37, and reinforces the latter, the triode section 42 acting in this respect as a means of regenerating the oscillatory current. The extent of regeneration is governed by the setting of the variable resistance 41 such that oscillations in the tank circuit 37 remain constant between synchronizing pulses.

The voltage present across the tank circuit 37 is applied via a coupling condenser 45 to the input circuit of a mixer 14, comprising a double triode, separate sections of which may be identified by the reference numerals 46 and 47. The single cathode 57 of the double triode 46, 47 is established at a constant potential with respect to ground, by being connected over a resistance 48 to B+ line 49, the cathode being then returned to ground via parallel resistors 50 and 51. Resistors 48, 50 and 51 operate, then, as a voltage divider for dropping the B+ voltage of line 49 to a suitable value. The oscillatory energy applied to the control electrode 52 of the triode section 46 via coupling condenser 45, is applied likewise to a tap 54 on the large value grid resistor 50, via the lead 53. The position of tap 54 determines, then, the negative bias on grid 52, and is adjustable to vary the bias to and beyond cutoff. Thereby that portion of the oscillatory energy impressed between the control electrode 52 and the cathode of the triode section 46 which is effective to cause anode current flow in triode section 46 is a function of the position of the variable tap 54 along the resistors 50, and may be varied from zero to some maximum amount by moving the contact 54 toward cathode.

The anodes 55 and 56 of the triode sections 46 and 47 are tied together and connected directly to the anode of a pentode 60, and via coupling condenser 61 to the control electrode of a pentode 62, pentodes 60 and 62 being connected as a controlled one shot cathode coupled multivibrator. The triode section 46 is normally adjusted to provide at its output a negatively polarized portion of each cycle of oscillation of the current in the tank circuit 37, as negatively polarized pulses. These negatively polarized pulses serve to synchronize the multivibrator 19 in known fashion, causing the anode 63 of the pentode 62 rapidly to attain a predetermined positive potential when the control pulse attains a predetermined negative potential, and causing the anode 63 of the pentode 62 to decrease rapidly to some adjustment value, after the input control signal has passed through its negative maximum and has decreased in amplitude to some predetermined value. Since the control signals provided by the mixer 14 to the mutivibrator 19 are constituted of portions of sine waves, the time separation between points of the control wave form which cause successive operations of the multivibrator 19, or which determine the point of rapid increase and decrease of the potential of the anode 63, are adjustable by adjustment of the amplitude of the control signals. This adjustment may be accomplished, as has been explained hereinbefore, by adjustment of the position of the variable contact 54.

The output of the multivibrator 19, as it appears at the anode 63, and consisting of rectangular positive pulses having durations determined by the setting of the variable contact 54, and occurring at times determined by the phase of the oscillations existing in the tank circuit 37, are amplified in a pentode amplifier 65, being applied to the input circuit thereof via the lead 66. The pentode 65 is arranged in the manner of a phase inverter, that is to say, with both an anode and a cathode load circuit, 67 and 68, respectively. The potential available at the anode of the pentode 65 may, accordingly, be derived at an output terminal 64, the pentode then acting as a phase reversnig tube, so that the derivable output is negatively polarized. Alternatively, output may be derived from the cathode circuit of the pentode 65, at the terminal 69, this output being in phase with the input voltage and, accordingly, being positively polarized.

In operation, the frequency of the tank circuit 37 is selected so that a number of cycles of alternating current are generated therein between synchronizing pulses, corresponding with the desired number of vertical lines on the face of the cathode ray tube indicator of a television system. These oscillations have invariable phase with respect to the synchronizing pulses, since they are comprised in shock excited trains of oscillations which commence only upon the decay of the synchronizing pulse, and since the oscillation always starts from zero value in response to cessation of the synchronizing pulses, and in always the same direction. Accordingly, each train of pulses is precisely identical with preceding trains, so long as the tuning of the tank circuit does not change, not only in respect to frequency, but also in respect to phase. The resultant pulses available at the terminals 64 and 69 are similarly coherent, each train with the next, that is, the pulses are equally spaced in successive trains, and occur at identical times measured with respect to the termination of the synchronizing pulses. The frequency of the tank circuit 37 is so chosen that the desired number of cycles occurs during each horizontal trace of the cathode ray beam of the cathode ray tube indicator across the screen of the indicator, and for each cycle of the oscillations a variation of illumination occurs at the screen for a length of time determined by the setting of the variable tap 54 of the resistance 50, and at points determined by the frequency of the oscillatory circuit 37, and the timing of the synchronizing pulses applied to the terminal 1. As the line scanned progresses vertically along the screen, accordingly, vertical lines are traced on the screen, the widths of which are adjustable by adjustment of tap 54, and the number of which are adjustable, by variation of the tuning of the resonant circuit 37.

Horizontal bars, in accordance with the present invention, are generated in response to vertical blanking pulses applied to the terminal 3. These pulses are amplified in the resistance coupled amplifier 6, which is of conventional character, per se, and then supplied to the coherent oscillator 10, the detailed construction and the mode of operation of which correspond with the details of operation and the construction of the coherent oscillator 9, except in that the resonant circuit 70 of the coherent oscillator 10 is tuned to a frequency appropriate for generation of horizontally extending bars, and consequently is of considerably lower frequencies than the resonant circuit 37.

Oscillatory voltage available across the tank or oscillatory circuit 70 is applied via the lead 71 to the control electrode 72 of the triode section 47 of the mixer 14, and between the control electrode 72 and ground via a tapped portion of the variable resistance 51. Accordingly, the triode section 47 may be biased to or beyond anode current cutoff, by the variable tap 73 of the variable resistance 51. The tap may thereby be set to enable passage of any desired portion 18 (Fig. 1) of the output of the oscillatory circuit 70, from zero to the full magnitude thereof, and this output may be applied to the control electrode of the pentode 62 of the multivibrator 19, causing flip-flop operation of the latter, to generate pulses 21 (Fig. 1) in a manner identical with that which has been described hereinbefore in connection with the high frequency pulses derivable from the triode section 46 of the mixer 14.

The low frequency pulses 21 may be applied, then, over the lead 66, to the pentode amplifier stage 22, and become available in positive polarity at the terminal 69, and in negative polarity at the terminal 64, in accordance with the description hereinbefore provided, when discussing the operation of the amplifier 22 to amplify short pulses provided in response to the output of the triode stage 46 of the mixer 14.

The long pulses 21, which generate the horizontal bars on the face of the cathode ray tube indicator of a television system, in response to operation of the coherent oscillator 10, occur at some multiple of the blanking pulse frequency, the multiple being determined by the number of horizontal bars which are desired, and the duration of the pulses may be set equal to one or more traces horizontally of the cathode ray beam across the screen, at times displaced from the timing of each vertical blanking pulse 8 by a multiple of the period of the oscillations of the tank circuit 70. Successive trains of horizontal bar generating pulses are coherent, and cause superposed bars to appear, since all generated pulses are identically synchronized with respect to the vertical blanking pulses.

When both horizontal and vertical bar generating pulses are applied simultaneously to the control electrodes 52 and 72 of the triode sections 46 and 47, and resultant control pulses 16 supplied to synchronize multivibrator 19, the short vertical bar generating pulses 17 may be considered superimposed on the relatively long horizontal bar generating pulses 18 (see Fig. 1), and lose all effective control of the multivibrator 19. Once a long pulse 18 has lost control, however, the next succeeding short pulse 17 reassumes control, and a further sequence of short pulses is provided for generating further elements of vertical lines on the screen of the television receiver. The system in accordance with the invention accordingly provides for generation of both vertical and horizontal bars in response to synchronization of a single multivibrator 19, both bar generating pulses being available at the same terminal simultaneously, but provides nevertheless for independent control of the horizontal and vertical bars in respect to width thereof, as well as for complete elimination of either set of bars, as desired, by means of simple readily operated controls, 54, 73. The use of coherent oscillators for synchronizing the multivibrator provides positive, rigidly phase controlled signals for the multivibrator, these control signals being under complete control of the blanking or synchronizing pulses.

It is desirable for many purposes to provide horizontal or vertical bar generated pulses, selectively, rather than both simultaneously. In such event, the system of Fig. 2 may be very considerably simplified, dispensing with one of the coherent oscillators by providing the remaining coherent oscillator with a pair of selective insertable tank circuits, one of which generates oscillations suitable for providing horizontal bars, and the other of which generates pulses suitable for generating vertical bars. The mixer circuit of Fig. 2 may be dispensed with, and the output of the coherent oscillator applied directly to a multivibrator, and the output of the latter then amplified, and, if desired, phase inverted, to provide alternatively positive or negative output.

Figure 3:
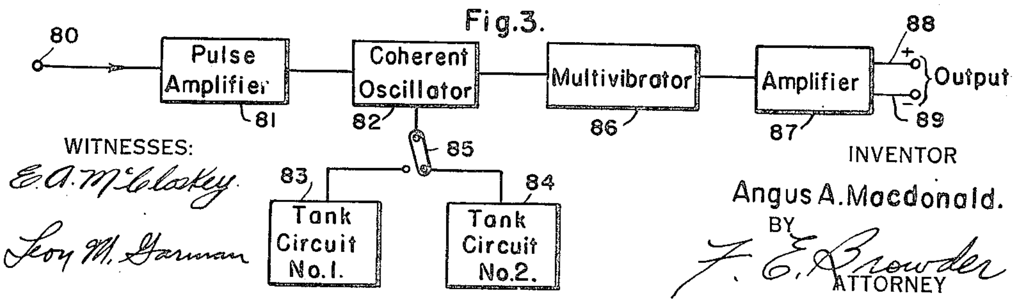
Fig. 3 is a block diagram of a modification of the system of Figs. 1 and 2, and which represent a simplified embodiment of a system embodying the present invention.

Reference is now made to Fig. 3 of the accompanying drawings, wherein is illustrated, in functional block diagram, a simplified bar generator, which provides selectively vertical or hoizontal bar generating pulses, but not both simultaneously. The details of the circuit of Fig. 3 follow closely the details of the schematic circuit diagram provided in Fig. 2 of the accompanying drawings, and, accordingly, a schematic circuit diagram corresponding with the block diagram of Fig. 3 is dispensed with, as unnecessary.

In Fig. 3, the terminal 80 may be connected either to a source of vertical blanking pulses or to a source of horizontal blanking pulses, as desired. The blanking pulses may be amplified in the pulse amplifier 81, which may be designed, for this purpose, to accept either horizontal or vertical pulses, and the output of the pulse amplifier 81 is applied to shock excite and synchronize the coherent oscillator 82. The latter may be provided with a pair of tank circuits, 83 and 84, which may be selectively connected in circuit with the vacuum tubes comprised in the coherent oscillator 82 by means of the manual switch 85, the mode of interconnection of the tank circuits 83, 84 being identical with that illustrated in Fig. 2 of the drawings, and described in connection with the detailed exposition of the circuit there illustrated. The output of the coherent oscillator 82 may then be applied to synchronize the operation of a multivibrator 86, which may be identical with the multivibrator 19 of Fig. 2 of the drawings. The output of the multivibrator 86 is amplified by the phase inverting amplifier 87, to provide positively poled output at the terminal 88, and negatively polarized output at the terminal 89.

While I have described various modifications of the present invention, it will be clear that variations of the specific arrangements shown and of details thereof may be resorted to without departing from the true spirit and scope of the present invention.

I claim as my invention:

1. A television bar generator comprising, a first shock excited oscillator, a second shock excited oscillator, a source of horizontal blanking pulses, a source of vertical blanking pulses, means responsive to termination of said horizontal blanking pulses for shock exciting said first shock excited oscillator, means responsive to termination of said vertical blanking pulses for shock exciting said second shock excited oscillator, means for combining signals derivable from said first and second shock excited oscillators to provide a complex wave, and a single multivibrator synchronized by said complex wave to provide a pulse pattern containing periodic pulses of first and second recurrence rates.

2. A television pattern generator, comprising, a first source of shock excited sine waves, a second source of shock excited sine waves of substantially lower frequency than the frequency of said first shock excited sine wave, a multivibrator, and means for synchronizing said multivibrator in response jointly to said first and second shock excited sine waves.

3. A system for generating a television test pattern in response to horizontal and vertical television synchronizing pulses, comprising, a source of trains of sine wave oscillations of first predetermined frequency, a source of trains of sine wave oscillations of second predetermined frequency, means responsive to each of said horizontal synchronizing pulses for actuating said first mentioned source to generate one of said trains of sine waves of first predetermined frequency, means responsive to each of said vertical synchronizing pulses for actuating said second mentioned source to generate one of said trains of sine waves of second predetermined frequency, and a multivibrator synchronizable alternatively and simultaneously in response to said sine waves of first predetermined frequency and in response to said sine wave of second predetermined frequency.

4. A system for generating a television test pattern in response to horizontal and vertical television synchronizing pulses, comprising, a source of trains of sine wave oscillations of first predetermined frequency, a source of trains of sine wave oscillations of second predetermined frequency, means responsive to each of said horizontal synchronizing pulses for actuating said first mentioned source to generate one of said trains of sine wave oscillations of first predetermined frequency, means responsive to each of said vertical synchronizing pulses for actuating said second mentioned source to generate one of said trains of sine wave oscillations of second predetermined frequency, a synchronizable multivibrator arranged to generate a leading edge of a substantially square wave in response to application thereto of a voltage of at least predetermined magnitude, and to generate a trailing edge of said substantially square wave in response to subsequent application to said multivibrator of a voltage of less than said predetermined magnitude, means for applying said sine wave oscillations of first predetermined frequency to said synchronizable multivibrator to determine the time positions of said leading and trailing edges, and means for applying said sine wave oscillations of second predetermined frequency to said synchronizable multivibrator to determine further the time positions of said leading and trailing edges.

5. A system for generating a television test pattern in response to horizontal and vertical television synchronizing pulses, comprising, a source of trains of sine wave oscillations of first predetermined frequency, a source of trains of sine wave oscillations of second predetermined frequency, means responsive to termination of each of said horizontal synchronizing pulses for actuating said first mentioned source to generate one of said trains of sine wave oscillations of first predetermined frequency, means responsive to termination of each of said vertical synchronizing pulses for actuating said second mentioned source to generate one of said trains of sine wave oscillations of second predetermined frequency, a synchronizable multivibrator arranged to generate a leading edge of a substantially square wave in response to application thereto of a voltage of at least predetermined magnitude, and to generate a trailing edge of said substantially square wave in response to subsequent application to said multivibrator of a voltage of less than said predetermined magnitude, means for deriving and applying peak portions of said sine wave oscillations of first predetermined frequency to synchronize said synchronizable multivibrator, and means for deriving and applying peak portion of said sine wave oscillations of second predetermined frequency to synchronize said synchronizable multivibrator.

6. A system for generating a television test pattern in response to horizontal and vertical television synchronizing pulses, comprising, a source of trains of sine wave oscillations of first predetermined frequency, a source of trains of sine wave oscillations of second predetermined frequency, means responsive to termination of each of said horizontal synchronizing pulses for actuating said first mentioned source to generate one of said trains of sine wave oscillations of first predetermined frequency, means responsive to termination of each of said vertical synchronizing pulses for actuating said second mentioned source to generate one of said trains of sine wave oscillations of second predetermined frequency, a synchronizable multivibrator arranged to generate a leading edge of a substantially square wave in response to application thereto of a voltage of at least predetermined magnitude, and to generate a trailing edge of said substantially square wave in response to subsequent application to said multivibrator of a voltage of less than said predetermined magnitude, a mixer stage for deriving and superposing predetermined portions of said sine wave oscillations of first predetermined frequency and of said second predetermined frequency to provide synchronizing signals for said synchronizable multivibrator, and means for applying said synchronizing signals to synchronize said synchronizable multivibrator.

7. A system for generating a television test pattern in response to horizontal and vertical television synchronizing pulses, comprising, a source of trains of sine wave oscillations of first predetermined frequency, a source of trains of sine wave oscillations of second predetermined frequency, means responsive to each of said horizontal synchronizing pulses for actuating said first mentioned source to generate one of said trains of sine wave oscillations of first predetermined frequency, means responsive to each of said vertical synchronizing pulses for actuating said second mentioned source to generate one of said trains of sine wave oscillations of second predetermined frequency, and a multivibrator synchronizable alternatively in response to said sine waves of first predetermined frequency and in response to said sine waves of second predetermined frequency, means for applying said sine waves of first predetermined frequency and said sine waves of second predetermined frequency simultaneously to said multivibrator for synchronization thereof, and means for selectively suppressing said sine waves.

8. A television bar generator, comprising, a source of horizontal and vertical television synchronizing pulses, a coherent oscillator comprising a first tank circuit, a second tank circuit, and an exciting circuit for said tank circuits, means for selectively associating said first and second tank circuits with said exciting circuit, and means responsive selectively to said horizontal and vertical synchronizing pulses for controlling said exciting circuit.

References Cited in the file of this patent

UNITED STATES PATENTS

| Number | Name | Date |
|---|---|---|
| 2,338,646 | Kessler | Jan. 4, 1944 |
| 2,434,894 | Ambrose | Jan. 27, 1948 |
| 2,438,904 | De Rosa | Apr. 6, 1948 |
| 2,464,393 | Keim | Mar. 15, 1949 |
| 2,474,219 | Busignies | June 28, 1949 |
| 2,519,030 | Dome | Aug. 15, 1950 |
| 2,551,771 | Spielman | May 8, 1951 |
| 2,572,083 | White | Oct. 23, 1951 |
| 2,573,070 | Stafford et al. | Oct. 30, 1951 |